W. L. HADLOCK.
FIGURE TOY.
APPLICATION FILED NOV. 15, 1916.

1,221,314.

Patented Apr. 3, 1917.

WITNESSES:
Warren P. Smith
J. M. Griffin

INVENTOR.
Walter L. Hadlock
BY
ATTORNEYS.

UNITED STATES PATENT OFFICE.

WALTER L. HADLOCK, OF PORTLAND, OREGON.

FIGURE TOY.

1,221,314.  Specification of Letters Patent.  Patented Apr. 3, 1917.

Application filed November 15, 1916. Serial No. 131,565.

*To all whom it may concern:*

Be it known that I, WALTER L. HADLOCK, a citizen of the United States, residing in the city of Portland, county of Multnomah, and State of Oregon, have invented a certain new and useful Figure Toy, of which the following is a specification.

My invention relates to an article of manufacture, and more particularly to an article adapted primarily for use as an advertising novelty, although it is also well adapted for use as a toy or amusement article.

In order that others may clearly understand my invention I have illustrated one practical embodiment thereof in the accompanying sheet of drawings in which,—

Figure 1:
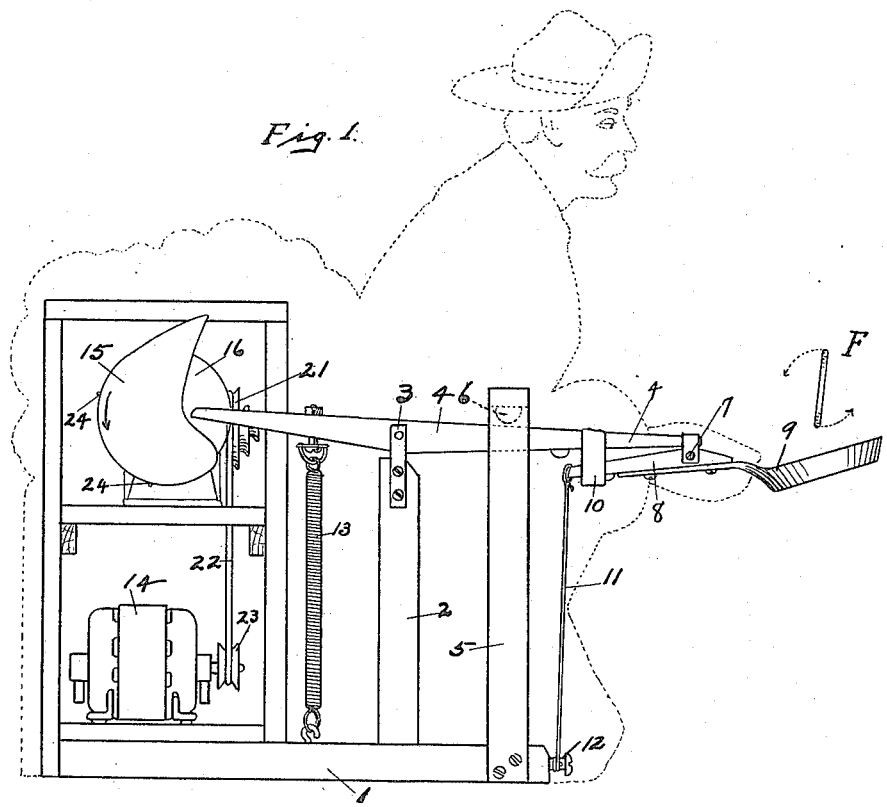
Figure 2:
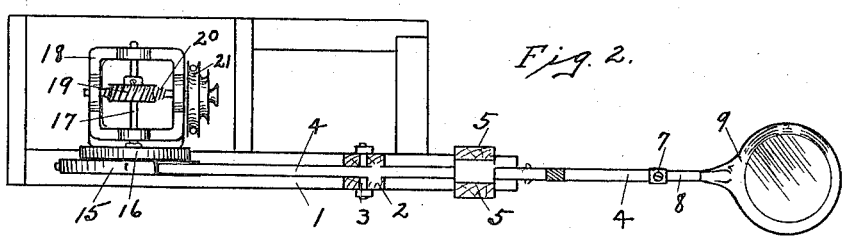

Figure 1 is a side elevation of the mechanism of the article, the figure, or picture, which stands in front of the mechanism, being shown in dotted lines; and Fig. 2 is a top plan view of the mechanism.

In the invention, as here shown for purposes of illustration, the figure, indicated in dotted lines, outlines the picture of a miner down on one knee, holding a frying pan in his hand in which is a flapjack. The hand of the miner is mounted on a part of the mechanism, hereinafter described, and moves with it. The frying pan appears to be held by the miner over a fire (not shown), and at intervals, as the device is operated, the frying pan is given a sudden movement, which tosses the flapjack up into the air in a way which causes it to turn over and light again in the pan. A jostling movement is given to the pan between each turning movement thereof so as to make sure that the cake is properly placed in order to be turned over with the next quick movement of the pan.

I will now describe the mechanism, which occupies a position back of the picture, and which operates to intermittently toss and turn the flapjack in the frying pan. 1 designates a base upon which is mounted a supporting standard 2, upon the upper end of which is pivotally mounted, as at 3, a supporting and operating arm 4. Spaced upright members 5—5, are mounted on the base 1, at opposite sides of the arm 4, and are provided between their upper ends, immediately over the arm 4, with a bumper piece 6, preferably of rubber, or other soft material. Pivotally mounted, as at 7, to the outer end of the operating arm 4, is a holding lever 8, to which is secured a frying pan 9. The opposite end of the holding lever 8, moves in a guide 10, projecting downwardly from the operating arm 4. Secured to the inner end of the holding lever 8, is a cord 11, secured at its lower end, as at 12. A spring 13, is attached at its lower end to the base 1, and at its upper end to the operating arm 4, and operates to normally draw the operating lever down at its rear end, raising it at its outer end.

The invention, as here illustrated, is operated by means of an electric motor 14, although any motive power can be used. An operating cam 15, is mounted upon the side of a disk 16, carried at the outer end of a shaft 17, mounted in a suitable frame 18, and provided with a worm-gear 19, said worm-gear 19, being driven by a worm 20, driven by a pulley 21, driven by a belt, or cable, 22, from a pulley 23, on said motor.

Thus by using pulleys 23 and 21 of different sizes, and driving the operating cam 15, through the worm and worm-gear, the cam may be given a proper speed for intermittently moving and releasing the operating lever 4.

In order to give a slight jostling movement to the supporting and operating arm 4, as the cam 15, is revolving, said cam may be provided with one or more small knobs, as 24—24.

The operation of my invention may be briefly described as follows:

The motor is started, which drives the cam 15, in the direction indicated by the arrow. As the cam 15, engages the end of the arm, or lever, 4, it is gradually raised until it occupies a position on top of the point of the cam 15, which is its extreme high position. As the cam advances, said lever, or arm, 4, drops off the top, or point of the cam, and is drawn downwardly by the spring 13. It is shown in this position in full lines. As the cam end of the arm, or lever, 4, is raised, the outer end, of course, is lowered. This allows the lever 8, by reason of the weight of the pan 9, to swing up against the under side of the outer end of the arm 4. The cord 11, attached to the inner end of the lever 8, becomes loose. As the cam end of the lever 4, slips off the point of the cam and is drawn down quickly by the spring 13, the outer end of the lever 4, together with the lever 8, resting up against the under side of the same, moves upwardly until the cord 11, is stretched, whereupon the lever 8, is given a quick independent movement by reason of the cord 11, which movement is sufficient to toss the flapjack F, upwardly in a way to turn it over and catch it again in the pan 9. The cam end of the arm, or lever, 4, is again engaged by the cam 15, and during the revolution of the latter the arm 4, engages the lugs 24, on the surface of the cam and is jostled thereby as it drops therefrom on to the cam body. This movement serves to place the flapjack flatwise on the bottom of the pan 9.

I am aware that my invention can be embodied in other devices for tossing and again catching articles in a receptacle, and I do not, therefore, limit my invention to the particular embodiment thereof here shown and described for purposes of illustration, except as I may be limited by the hereto appended claims.

I claim:

1. In a device of the character referred to, a movably supported arm, a receptacle supported by said arm, an article in said receptacle, means for imparting a quick movement to said arm and said receptacle, whereby to toss the article in said receptacle and catch it again therein.

2. In a device of the character referred to, a movably supported arm, a receptacle supported by said arm, an article in said receptacle, means for mechanically and intermittently imparting a quick movement to said arm and said receptacle, whereby to toss the article in said receptacle and catch it again therein.

3. In a device of the character referred to, a movably supported arm, a receptacle supported by said arm, an article in said receptacle, means for moving said arm so as to lower said receptacle, and means for giving a quick upward movement to the outer end of said arm and to said receptacle, whereby to toss the article therein.

4. In a device of the character referred to, a movably supported arm, a receptacle supported by said arm, an article in said receptacle, means for moving said arm so as to lower said receptacle, and means for mechanically and intermittently giving a quick upward movement to the outer end of said arm and to said receptacle, whereby to toss the article therein.

5. In a device of the character referred to, a pivotally mounted arm, means for intermittently raising and releasing said arm, a receptacle pivotally connected to the outer end of said arm and moving therewith, and means for giving a quick movement to said receptacle relative to said arm, as said arm is released, for the purpose described.

6. In a device of the character referred to, a supporting arm pivotally mounted intermediate its ends, a receptacle pivotally connected to the outer end of said arm, means for intermittently raising and releasing the opposite end of said arm, and means whereby the receptacle at the outer end of said arm is given a quick movement relative to said arm, as said arm drops to its lowermost position at its opposite end.

7. In a device of the character referred to, a supporting and operating arm pivotally mounted intermediate its ends, a rotary cam with means for operating the same to intermittently raise and drop one end of said arm, a receptacle pivotally connected to the outer end of said arm, and means for causing a quick movement of said receptacle relative to said arm, as the latter is dropped at its opposite end from its raised to its lowered position.

8. In a device of the character referred to, a supporting and operating arm pivotally mounted intermediate its ends, a rotary cam with means for operating the same to intermittently raise and release said arm, means for moving said arm downwardly when released, a receptacle pivotally connected to the outer end of said arm, and means for causing a quick movement of said receptacle relative to said arm, as the latter is moved downwardly when released, for the purpose described.

9. An article of manufacture comprising in combination a supporting and operating arm pivotally mounted intermediate its ends, means operating to normally move one end of said arm downwardly, a stop to limit said movement, mechanical means for intermittently raising and releasing one end of said arm, a receptacle pivotally connected to the outer end of said arm by means of a lever, and means connected with said lever for imparting a quick movement to said receptacle relative to said supporting and operating arm as the latter is moved downwardly at its opposite end when released, substantially as described.

10. An article of manufacture comprising in combination a pivotally mounted supporting and operating arm, a receptacle pivotally mounted to the outer end of said arm, means for mechanically and intermittently raising and releasing the opposite end of said arm, means for imparting a slight movement to said arm as it is being raised, whereby to jostle the receptacle at the opposite end thereof, means for moving the raised end of said arm downwardly when released, means at the opposite end of said arm for causing a quick movement of said receptacle relative to said arm as the opposite end of said arm is moved downwardly and the receptacle-end of said arm is moved upwardly, and an article in said receptacle adapted to be tossed and turned therein by said movement.

11. An article of manufacture comprising in combination a pivotally mounted supporting and operating arm, a spring operating to draw one end of said arm downwardly, a receptacle pivotally connected to the opposite end of said arm by means of a short lever, a cam with means for driving the same, adapted to intermittently raise and release one end of said arm, means on said cam for imparting a quick short movement to said arm during the raising movement thereof, means for imparting an accelerated movement to said receptacle relative to said arm, as said arm is released and moved downwardly at one end and moved upwardly at its opposite end, and an article in said receptacle adapted to be tossed and turned therein by such accelerated movement.

Signed at Portland, Multnomah county, Oregon, this 9th day of November, 1916.

WALTER L. HADLOCK.

In presence of—
I. M. GRIFFIN,
WARREN P. SMITH.